(12) United States Patent
Lin

(10) Patent No.: US 12,096,878 B1
(45) Date of Patent: Sep. 24, 2024

(54) STRAW CUP

(71) Applicant: Yisheng Lin, Guangdong (CN)

(72) Inventor: Yisheng Lin, Guangdong (CN)

( * ) Notice: Subject to any disclaimer, the term of this patent is extended or adjusted under 35 U.S.C. 154(b) by 0 days.

(21) Appl. No.: 18/400,127

(22) Filed: Dec. 29, 2023

(30) Foreign Application Priority Data

Jul. 4, 2023 (CN) .......................... 202321741239.5

(51) Int. Cl.
| | |
|---|---|
| *A47J 31/20* | (2006.01) |
| *A47G 19/16* | (2006.01) |
| *A47G 19/22* | (2006.01) |
| *A47J 31/00* | (2006.01) |
| *A47J 31/06* | (2006.01) |
| *A47J 31/44* | (2006.01) |
| *B65D 43/02* | (2006.01) |
| *B65D 47/06* | (2006.01) |
| *B65D 51/28* | (2006.01) |
| *H01F 7/02* | (2006.01) |

(52) U.S. Cl.
CPC .............. *A47J 31/20* (2013.01); *A47G 19/16* (2013.01); *A47G 19/2272* (2013.01); *A47J 31/005* (2013.01); *A47J 31/0615* (2013.01); *A47J 31/0626* (2013.01); *A47J 31/4407* (2013.01); *B65D 43/0202* (2013.01); *B65D 47/06* (2013.01); *B65D 51/28* (2013.01); *H01F 7/02* (2013.01); *A47G 2200/106* (2013.01); *B65D 2543/00046* (2013.01); *B65D 2543/00092* (2013.01)

(58) Field of Classification Search
None
See application file for complete search history.

(56) References Cited

U.S. PATENT DOCUMENTS

| | | | | |
|---|---|---|---|---|
| 1,847,879 A | * | 3/1932 | Knecht ................ | A47G 21/181 215/388 |
| 2,562,433 A | * | 7/1951 | Moore .................... | A47J 31/20 99/300 |
| 4,494,668 A | * | 1/1985 | Lottick .............. | A47G 19/2288 215/229 |
| 5,183,183 A | * | 2/1993 | Hernandez ......... | A47G 19/2266 D7/619.1 |
| 5,809,867 A | * | 9/1998 | Turner .................... | A47J 31/20 99/287 |

(Continued)

FOREIGN PATENT DOCUMENTS

CN 212995854 U 4/2021

*Primary Examiner* — Thor S Campbell
(74) *Attorney, Agent, or Firm* — Cooper Legal Group, LLC

(57) ABSTRACT

A straw cup comprises a cup body having a hollow inner cavity; a cup lid configured to cover an opening of the cup body; a straw configured to extend into the inner cavity of the cup body, and at least a first part of the straw is connected with the cup lid; and a tea strainer comprising a first magnetic component, the cup lid comprises a second magnetic component that can magnetically attract the first magnetic component, a relative position of the second magnetic component and the first magnetic component is variable, such that the tea strainer is configured to be magnetically connected to or separated from the cup lid, and the tea strainer is connected with the straw, such that the tea strainer is configured to be able to move along the direction of longitudinal axis of the straw.

19 Claims, 18 Drawing Sheets

(56) References Cited

U.S. PATENT DOCUMENTS

| | | | | |
|---|---|---|---|---|
| 6,324,966 B1* | 12/2001 | Joergensen | A47J 31/20 | 99/287 |
| 7,040,218 B1* | 5/2006 | Biolchini, Jr. | A47J 31/20 | 99/287 |
| 7,093,531 B2* | 8/2006 | Tardif | A47J 31/20 | 99/287 |
| 7,337,705 B1* | 3/2008 | Catena | A47J 31/20 | 99/287 |
| 7,779,751 B2* | 8/2010 | Gilbert | A47J 31/20 | 99/322 |
| 8,313,644 B2* | 11/2012 | Harris | C02F 1/002 | 210/205 |
| 8,459,492 B2* | 6/2013 | Merino | A47G 19/2211 | 215/389 |
| 9,993,011 B2* | 6/2018 | Feber | A47J 31/002 | |
| 10,219,647 B2* | 3/2019 | Richardson | A47J 31/057 | |
| 10,258,185 B2* | 4/2019 | Hyman | A47J 31/56 | |
| 10,398,255 B2* | 9/2019 | Constantine | A23C 3/037 | |
| 10,464,711 B2* | 11/2019 | Tsui | A47J 27/21008 | |
| 10,716,426 B2* | 7/2020 | Yakos | A47J 31/18 | |
| 11,089,893 B2* | 8/2021 | Kubota | B01D 35/02 | |
| 11,447,307 B2* | 9/2022 | Croibier | A45D 34/00 | |
| 11,877,689 B1* | 1/2024 | Lin | A47J 31/0615 | |
| 2007/0222619 A1* | 9/2007 | Moran | G01F 15/0755 | 702/45 |
| 2007/0256569 A1* | 11/2007 | Lee | A47J 31/18 | 99/275 |
| 2013/0312617 A1* | 11/2013 | Toporovsky | A47J 31/005 | 99/280 |
| 2014/0116259 A1* | 5/2014 | Landford | A47J 31/20 | 99/323 |
| 2015/0329255 A1* | 11/2015 | Rzepecki | B65D 43/16 | 222/545 |
| 2019/0082880 A1* | 3/2019 | Kaufman | A47J 31/20 | |
| 2022/0039583 A1* | 2/2022 | Rivera | A47J 43/0722 | |

* cited by examiner

STRAW CUP

CROSS-REFERENCE TO RELATED APPLICATION

This application claims the priority to Chinese patent application No. 202321741239.5, filed on Jul. 4, 2023. The entirety of Chinese patent application No. 202321741239.5 is hereby incorporated by reference herein and made a part of this specification.

TECHNICAL FIELD

The present application relates to the field of utensils for drinking water, in particular to a straw cup.

BACKGROUND ART

At present, straw cups include a straw and a tea strainer. The straw may facilitate users to drink water. The tea strainer is used to separate the tea leaves and prevent the users from drinking the tea leaves.

The structure of the above-mentioned straw cup with tea strainer is revealed in Chinese patent CN212995854U, in which the tea strainer is fixed relative to the position of the straw, and the user cannot adjust the position of the tea strainer.

Regarding the above-mentioned related state of the art, the bottom of the straw in the straw cup is usually close to the bottom of the inner cavity of the straw cup, while the tea strainer is usually disposed close to the cup lid of the straw cup, or the tea strainer is connected with the cup lid. During use, the user cannot accurately adjust the position of the tea strainer, and thus cannot choose whether to soak tea leaves or not, and thus cannot adjust the taste of the tea.

SUMMARY

In order to facilitate the user to adjust the taste of tea, the present application provides a straw cup.

The present application provides a straw cup, including:
a cup body having a hollow inner cavity;
a cup lid configured to cover an opening of the cup body;
a straw configured to extend into the inner cavity of the cup body, and at least a first part of the straw is connected with the cup lid; and
a tea strainer comprising a first magnetic component, the cup lid comprises a second magnetic component that can magnetically attract the first magnetic component, a relative position of the second magnetic component and the first magnetic component is variable, such that the tea strainer is configured to be magnetically connected to or separated from the cup lid, and the tea strainer is connected with the straw, such that the tea strainer is configured to be able to move along the direction of longitudinal axis of the straw; wherein the tea strainer is configured to be able to move along the longitudinal axis of the straw in a direction away from the cup lid, or the tea strainer is configured to be able to move along the longitudinal axis of the straw in a direction close to the cup lid.

In the above technical solution, when the user needs to make tea, the second magnetic component is controlled to be separated from the first magnetic component. The tea strainer is separated from the cup lid, so that the tea strainer can enter into the inner cavity of the cup body along the longitudinal direction of the straw under the action of gravity. The tea leaves in the tea strainer are fully mixed with the water in the inner cavity of the cup body. The tea strainer is connected with the straw, so that the tea strainer is configured to move along the longitudinal axis of the straw. After the tea strainer is separated from the cup lid, the tea strainer moves along the longitudinal axis of the straw. The moving of the tea strainer is guided by the straw, which in turn facilitates the tea strainer to move smoothly to the bottom of the straw. When the user does not need to make tea, the second magnetic component can be controlled to be attracted to the first magnetic component. The tea strainer can be attracted to the cup lid again under the action of gravity, so that the tea leaves in the tea strainer are separated from the water in the inner cavity of the cup body. Furthermore, the moving direction of the tea strainer in the inner cavity of the cup body is reversible, therefore the user can adjust the position of the tea strainer at any time as needed.

In some embodiments, the relative position of the second magnetic component and the first magnetic component is variable, includes that the first magnetic component and the second magnetic component are close to or away from each other in horizontal direction, or that the first magnetic component and the second magnetic component are close to or away from each other in longitudinal direction, or that one of the first magnetic component and the second magnetic component changes the relative position by reversing a magnetic pole.

In particular, the first magnetic component and the second magnetic component are close to or away from each other in horizontal direction, means that the position of the first magnetic component is fixed, and the position of the second magnetic component relative to the longitudinal axis of the first magnetic component remains unchanged, while its horizontal position changes. When the horizontal distance between the second magnetic component and the first magnetic component is zero, the first magnetic component and the second magnetic component are aligned in the longitudinal axis direction, and the tea strainer is attracted to the cup lid. When the second magnetic component is far away from the first magnetic component, the tea strainer is separated from the cup lid. Vice versa, the position of the second magnetic component is fixed, and the position of the first magnetic component relative to the longitudinal axis of the second magnetic component remains unchanged, while its horizontal position changes. When the horizontal distance between the first magnetic component and the second magnetic component is zero, the first magnetic component and the second magnetic component are aligned in the longitudinal axis direction, and the tea strainer is attracted to the cup lid. When the first magnetic component is far away from the second magnetic component, the tea strainer is separated from the cup lid.

The first magnetic component and the second magnetic component are close to or far away from each other in vertical direction, means that the positions of the first magnetic component and the second magnetic component in the horizontal direction remain unchanged, and the relative distance between the first magnetic component and the second magnetic component in the longitudinal direction changes, that is, they can be close to and far away from each other in the longitudinal direction. When the two are close to each other, the tea strainer is fixed under the cup lid. When the two are far away from each other, the tea strainer is separated from the cup lid and falls into the cup body.

The first magnetic component and the second magnetic component changes the relative position by reversing the magnetic pole, means that the position of the first magnetic component is fixed, and the second magnetic component flips the magnetic pole by reversing itself, thereby achieving attraction and disengagement from the first magnetic component.

In some embodiments, a lower end of the straw is provided with a limiting structure configured to prevent the tea strainer from falling off freely from the straw.

In some embodiments, the cup lid is provided with a magnetic area and a non-magnetic area, the magnetic area and the non-magnetic area are arranged horizontally relative to the cup lid, or arranged vertically relative to the cup lid; the second magnetic component is configured to be movable from the magnetic area to the non-magnetic area; when the second magnetic component is in the magnetic area, the tea strainer and the cup lids are attracted to each other; and when the second magnetic component is in the non-magnetic area, the tea strainer and the cup lid are separated from each other.

In some embodiments, the cup lid includes a rotatable device, in particular, the second magnetic component is connected with the rotatable device and configured to drive the rotatable device, such that the second magnetic component is switched between the magnetic area and the non-magnetic area.

In some embodiments, the cup lid includes a movable push-pull device, in particular, the second magnetic component is connected with the push-pull device and configured to drive the push-pull device, such that the second magnetic component is switched between the magnetic area and the non-magnetic area.

In some embodiments, the cup lid includes a movable pressing device, the second magnetic component is connected with the pressing device and configured to drive the pressing device, such that the second magnetic component is switched between the magnetic area and the non-magnetic area.

In some embodiments, the second magnetic component is configured to be able to flip the magnetic pole, so as to change the magnetic attraction between the first magnetic component and the second magnetic component.

In some embodiments, the cup lid includes a flipping structure, in particular, the second magnetic component is connected with the flipping structure and configured to drive the flipping structure, such that a magnetic pole of the second magnetic component relative to the first magnetic component is changed.

In some embodiments, the tea strainer includes a tea strainer body and a tea strainer lid configured for covering an end opening of the tea strainer body, in particular, the tea strainer lid has a first penetration hole for the straw to pass through, a bottom of the tea strainer body has a second penetration hole for the straw to pass through.

In some embodiments, a guide tube is connected between the first penetration hole and the second penetration hole, the straw is configured to be sequentially inserted into the first penetration hole, the guide tube and extend out of the second penetration hole.

In some embodiments, a connection structure configured for connecting with the straw is disposed outside the tea strainer.

In some embodiments, the connection structure is a snap-in structure or a plug-in mechanism.

In some embodiments, one of the tea strainer and the straw is provided with a protrusion, and the other of the straw and the tea strainer is formed with a longitudinally extended sliding slot, the protrusion is configured to be inserted into and movable in the sliding slot.

In some embodiments, the connection structure is a sleeve, a collar or a collet disposed on the periphery of the tea strainer for the straw to pass through, the straw configured to be inserted into the sleeve, the collar or the collet, and is able to move longitudinally.

In some embodiments, an anti-rotation structure is disposed between the straw and the tea strainer, the anti-rotation structure is configured to fix a position of the tea strainer relative to a circumferential direction of the straw.

In the above technical solution, the rotation of the tea strainer on the straw can be restricted, that is, the tea strainer and the straw are in a relatively stable connection state. After the tea strainer is separated from the cup lid, the tea strainer can only move in the longitudinal direction on the straw under the action of gravity, which will not cause disengagement between the tea strainer and the straw.

In some embodiments, the straw includes a first section of the straw and a second section of the straw connected with each other, the first section of the straw is connected with the cup lid, and the tea strainer is connected with the second section of the straw.

In the above technical solution, the straw is configured in two sections, and the second section of the straw is detachable, thereby facilitating the disassembly of the tea strainer.

In some embodiments, a positioning structure is disposed between the first section of the straw and the second section of the straw, the positioning structure is configured to limit a rotation or a movement of the second section of the straw relative to the first section of the straw.

In the above technical solution, the second section of the straw is prevented from loosening from the first section of the straw.

In some embodiments, the cup body includes an opening, in particular, the opening has an inner diameter of less than 18 cm.

In some embodiments, the cup lid further includes a drinking port, and an user can choose to use the straw or the drinking port for drinking.

In some embodiments, a second part of the straw extends outside the cup lid, the straw cup further includes a dust cover configured for protecting the part of the straw that extends outside the cup lid.

In some embodiments, the straw cup further includes a driving mechanism connected to the tea strainer. The driving mechanism is driven to bring the first magnet and the second magnet to be separated.

In some embodiments, when the tea strainer is separated from the cup lid, the tea strainer is configured to slide down freely relative to the straw under the action of gravity.

In the above technical solution, the tea strainer can be freely moved toward and away from the cup lid along the straw without manual operation, that is, when the magnetic attraction between the tea strainer and the cup lid is removed, the tea strainer can automatically fall to the cup body to implement the tea making function. When the cup body is turned over, the tea strainer can move along the straw to the bottom of the cup lid and be attracted and fixed, thereby the tea strainer is separated from the cup body.

In summary, the present application can achieve at least one of the following beneficial technical effects:
1. The straw provides longitudinal guide to the tea strainer, so that the tea strainer move back and forth more quickly, which improves the efficiency of making tea, and thus improves the user experience;
2. further, the magnetic connection between the tea strainer and the cup lid is optimized, so that the magnetic connection or separation between the tea strainer and the cup lid can be controlled by driving the driving device on the cup lid; and 3. furthermore, the connection structure between the tea strainer and the straw is optimized, which facilitates the smoothly sliding of the tea strainer along the longitudinal direction of the straw.

DETAILED DESCRIPTION

Figure 1:
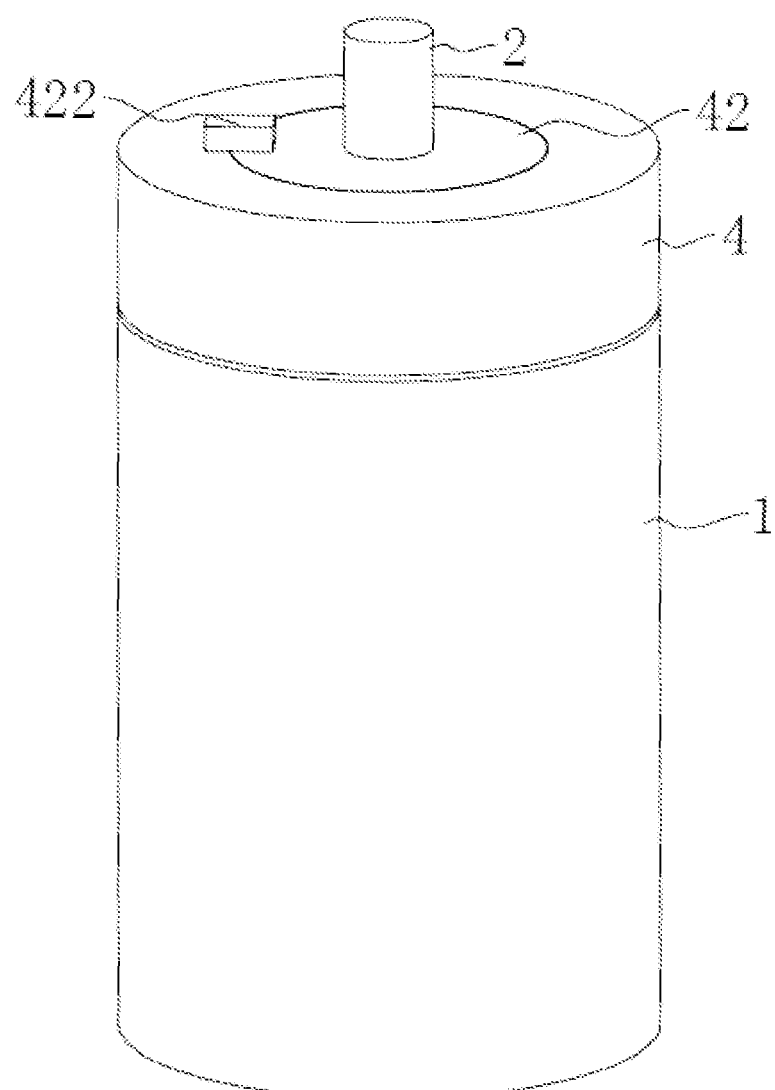
FIG. 1 is a stereoscopic view of a straw cup according to an embodiment of the present application.
Figure 2:
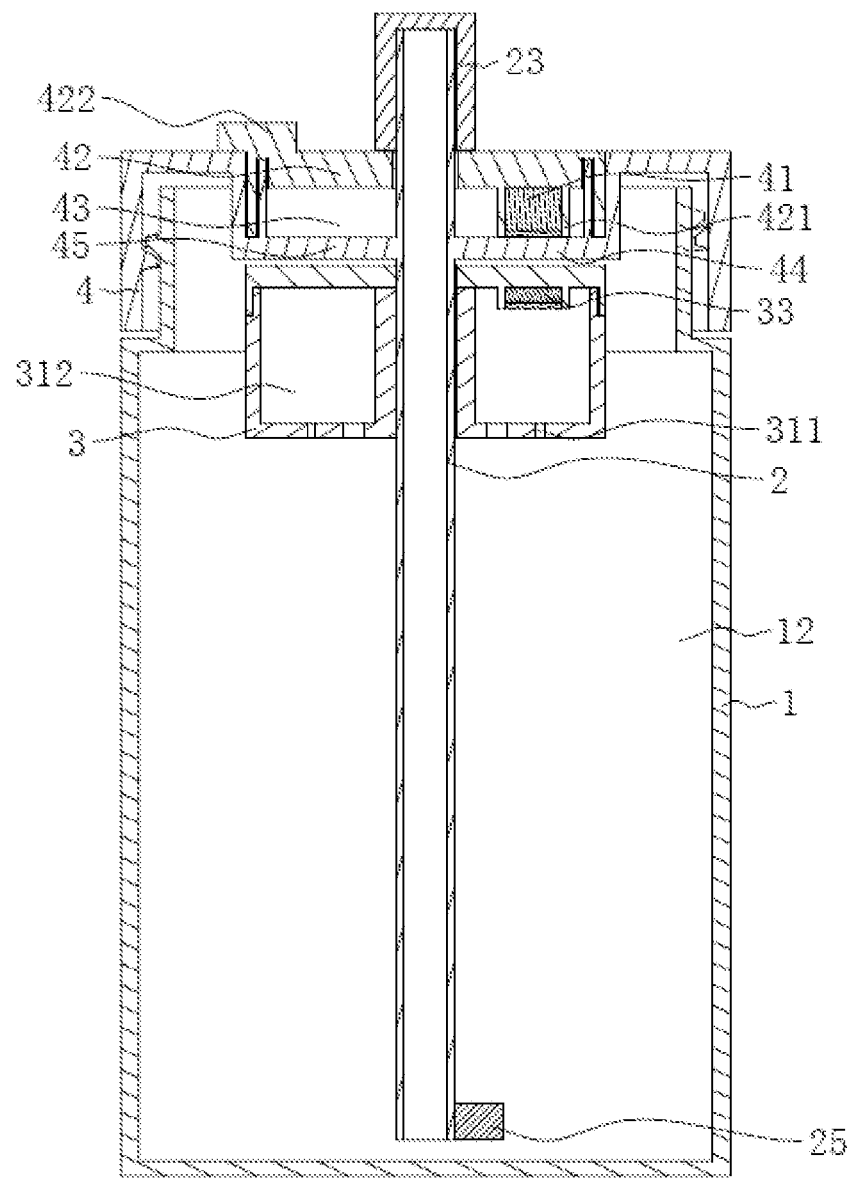
FIG. 2 is a cross-sectional view of the straw cup according to the first embodiment of the present application.

The embodiment of the present application discloses a straw cup, as shown in FIG. 1 and FIG. 2, the straw cup includes a cup body 1, a straw 2, a tea strainer 3 and a cup lid 4.

The cup body 1 has a side wall, a bottom wall and an opening at the top of the cup body 1. The side wall and bottom wall of the cup body 1 define a hollow inner cavity 12. The inner cavity 12 is configured to hold drinks. The cup lid 4 is connected at the top of the cup body 1 and is configured to close the top opening of the cup body 1. In particular, the cup body 1 and the cup lid 4 are configured in detachable connection. The detachable connection between the cup body 1 and the cup lid 4 can be configured as threaded connection, magnetic connection or snap-in connection in the prior art.

At least a part of the straw 2 is connected to the cup lid 4. A part of the straw 2 is located outside the cup lid 4. The rest part of the straw 2 extends into the inner cavity of the cup body 1, and an end of the straw 2 is close to the bottom wall of the cup body 1, so that the user sufficiently sucks the drink contained in the inner cavity 12 of the cup body 1 with the straw 2.

At least a part of the straw 2 is fixedly connected to the cup lid 4. In particular, the fixed connection between the cup lid 4 and the straw 2 includes riveting, threaded connection or snap-in connection. In other alternative embodiments, the cup lid 4 and at least a part of the straw 2 are integrally formed.

Figure 6:
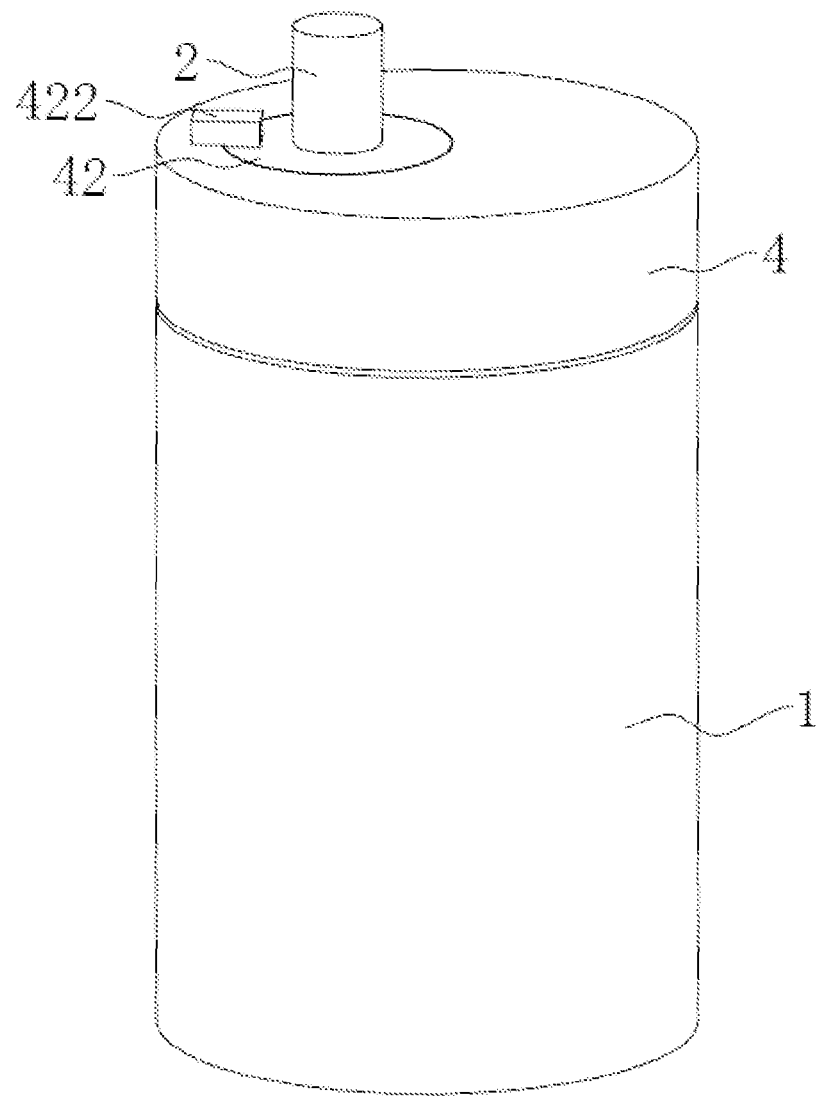
FIG. 6 is a stereoscopic view of a straw cup according to a further embodiment of the present application.

Referring to FIG. 1, the straw 2 can be located at the center of the cup lid 4. In other alternative embodiments, as shown in FIG. 6, the straw 2 can also be positioned close to the left or right side of the cup lid 4.

Referring to FIG. 2, the straw 2 may be a tubular member with an inner hole.

Figure 3:
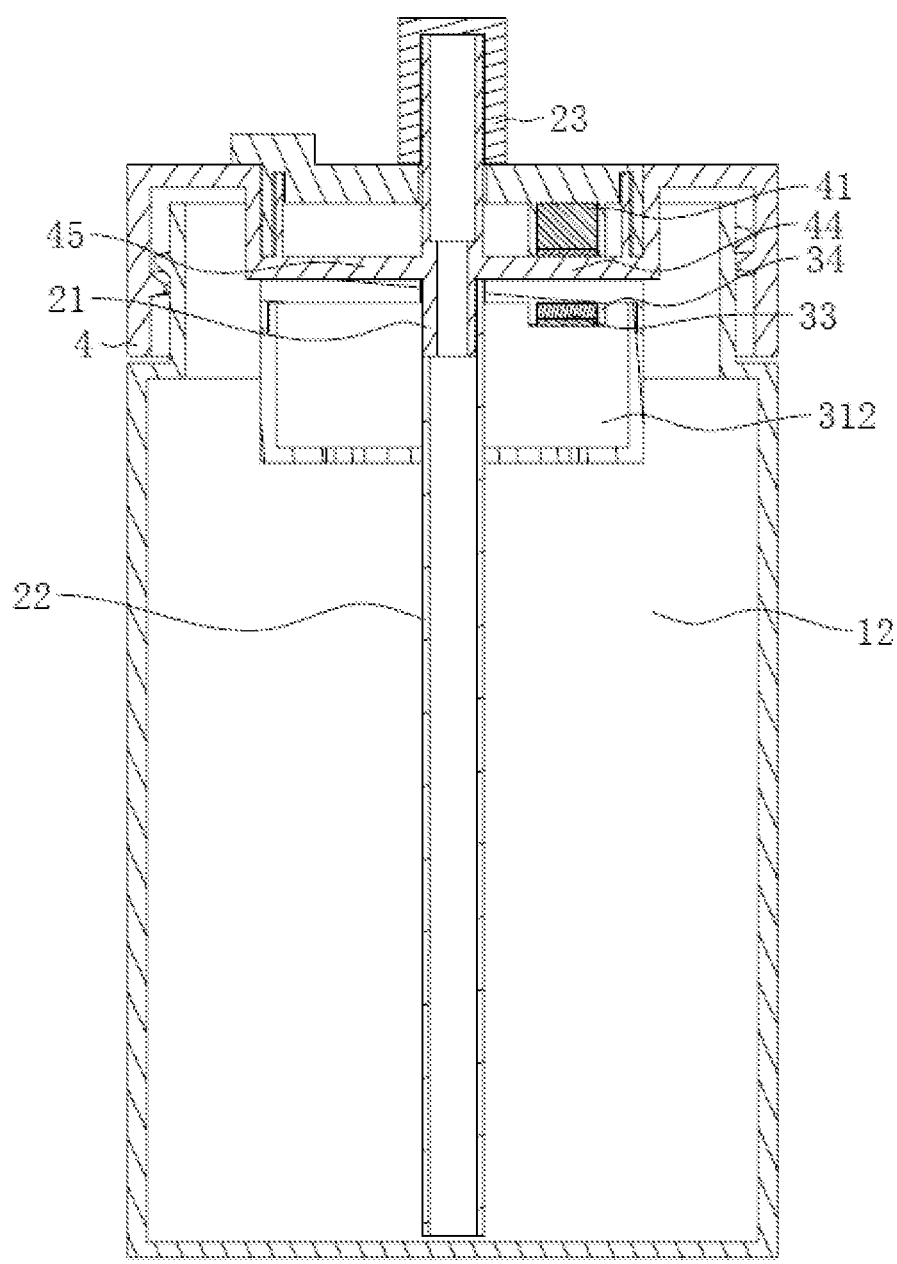
FIG. 3 is a cross-sectional view of the straw cup according to the second embodiment of the present application.

In another embodiment provided by the present application, as shown in FIG. 3, the straw 2 includes a first section of the straw 21 and a second section of the straw 22 that are connected to each other. In particular, the first section of the straw 21 is fixed on the cup lid 4. The first end of the second section of the straw 22 is connected to an end of the first section of the straw 21. The second end of the second section of the straw 22 is close to the bottom of the inner cavity 12 of the cup body 1 for sucking water.

A part of the first section of the straw 21 is configured to protrude from the cup lid 4. In order to prevent the exposed opening of the straw 2 from being contaminated, the exposed section of the first section of the straw 21 can be covered by a dust cap 23.

The straw cup further includes a tea strainer 3. The tea strainer 3 is configured to hold tea leaves. Particularly, the tea leaves can be green tea, scented tea, or fruit tea in the prior art. The form of the tea leaves can be loose tea or tea bags. The function of the tea strainer 3 is to separate the tea leaves and prevent the user from sucking the tea leaves while drinking water.

Figure 7:
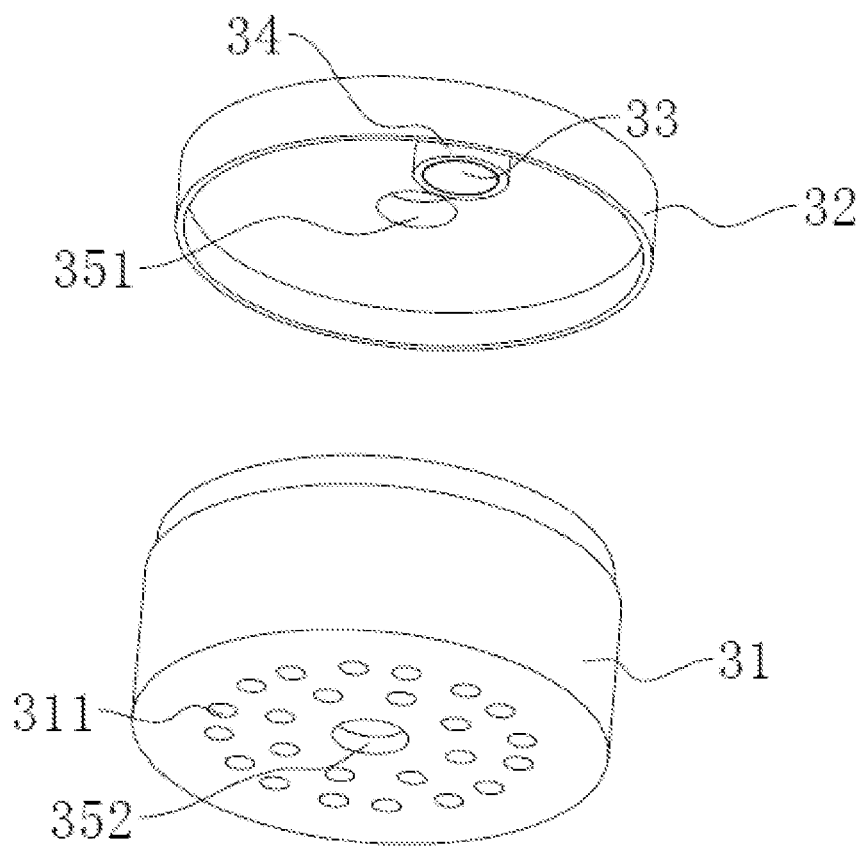
FIG. 7 is an explosive view of a tea strainer according to an embodiment of the present application.

With continued reference to FIG. 2 and FIG. 7, the tea strainer 3 includes a body 31. The body 31 includes a hollow first cavity 312. The first cavity 312 is configured to accommodate tea leaves. A plurality of through holes 311 are formed on the bottom wall of the body 31. The through holes 311 provide a passage for the water contained in the inner cavity 12 of the cup body 1 to enter the first cavity 312 so as to allow the tea leaves to be soaked. The plurality of through holes 311 are arranged at even intervals on most of the bottom wall of the body 31.

The tea strainer 3 further includes a tea strainer lid 32. The tea strainer lid 32 is configured to close the top opening of the body 31 so as to prevent the tea leaves contained in the first cavity 312 from directly entering the water and being sucked by the user during the shaking process of the straw cup.

In an embodiment provided by the present application, the structure of the tea strainer 3 is optimized, so that the tea strainer 3 can move relative to the straw 2 along the longitudinal axis of the straw 2, and the user can control the tea leaves contained in the tea strainer 3 being soaked in the water or control the tea leaves contained in the tea strainer 3 not contacting the water in the inner cavity 12 of the cup body 1, so as to effectively adjust the concentration of the tea in the straw cup.

In a specific embodiment, the tea strainer 3 is connected to the straw 2. The tea strainer 3 is configured to move along the longitudinal axis of the straw 2. Furthermore, the tea strainer 3 can move to the bottom of the inner cavity 12 along the longitudinal axis of the straw 2. Since the tip of the straw 2 always sucks the water located at the bottom of the inner cavity 12, the soaking efficiency can be sufficiently improved when the tea strainer 3 moves to the bottom of the inner cavity 12.

Figure 9:
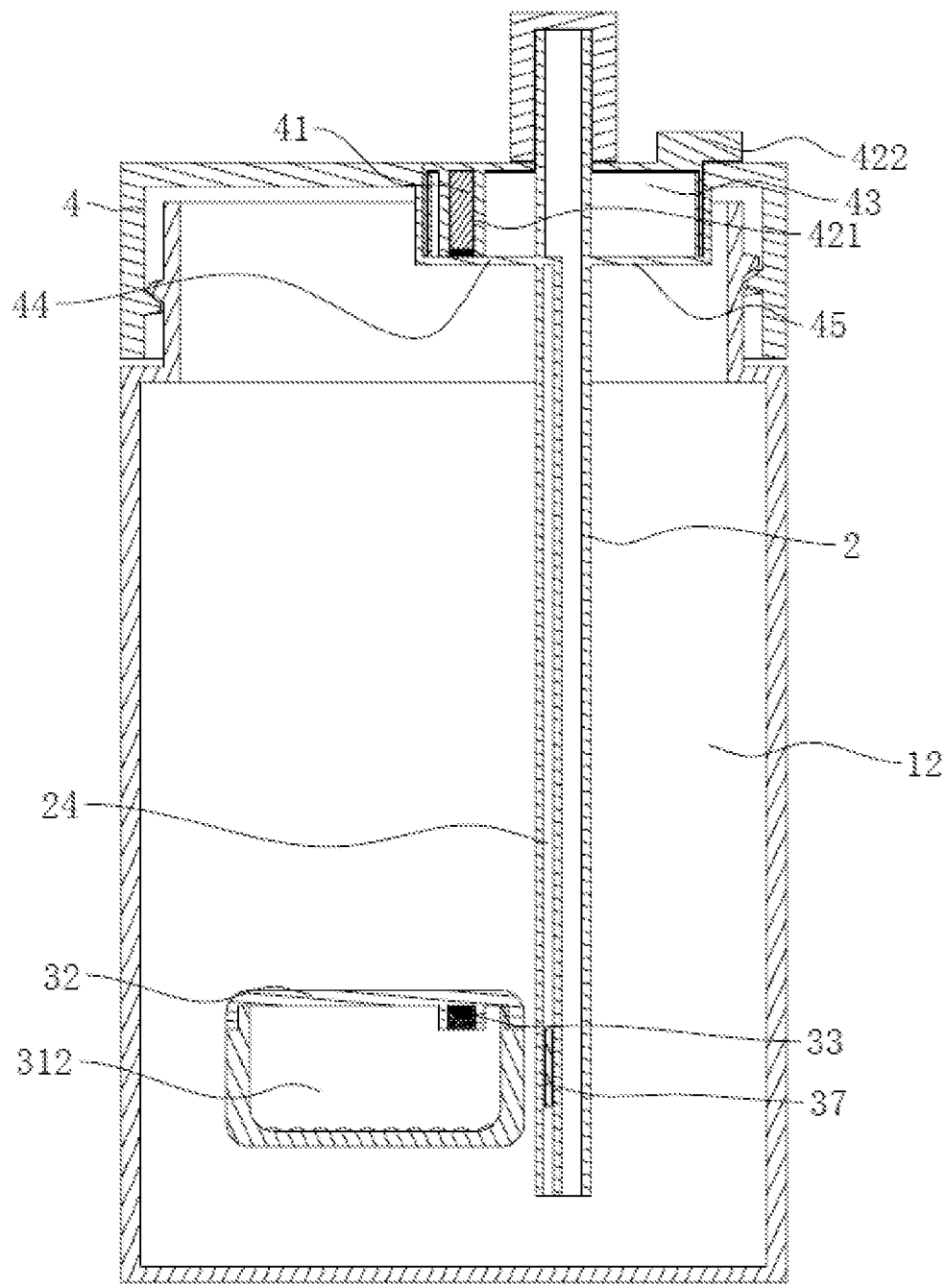
FIG. 9 is a cross-sectional view of the tea strainer moved to the bottom of the straw according to an embodiment of the present application.
Figure 10:
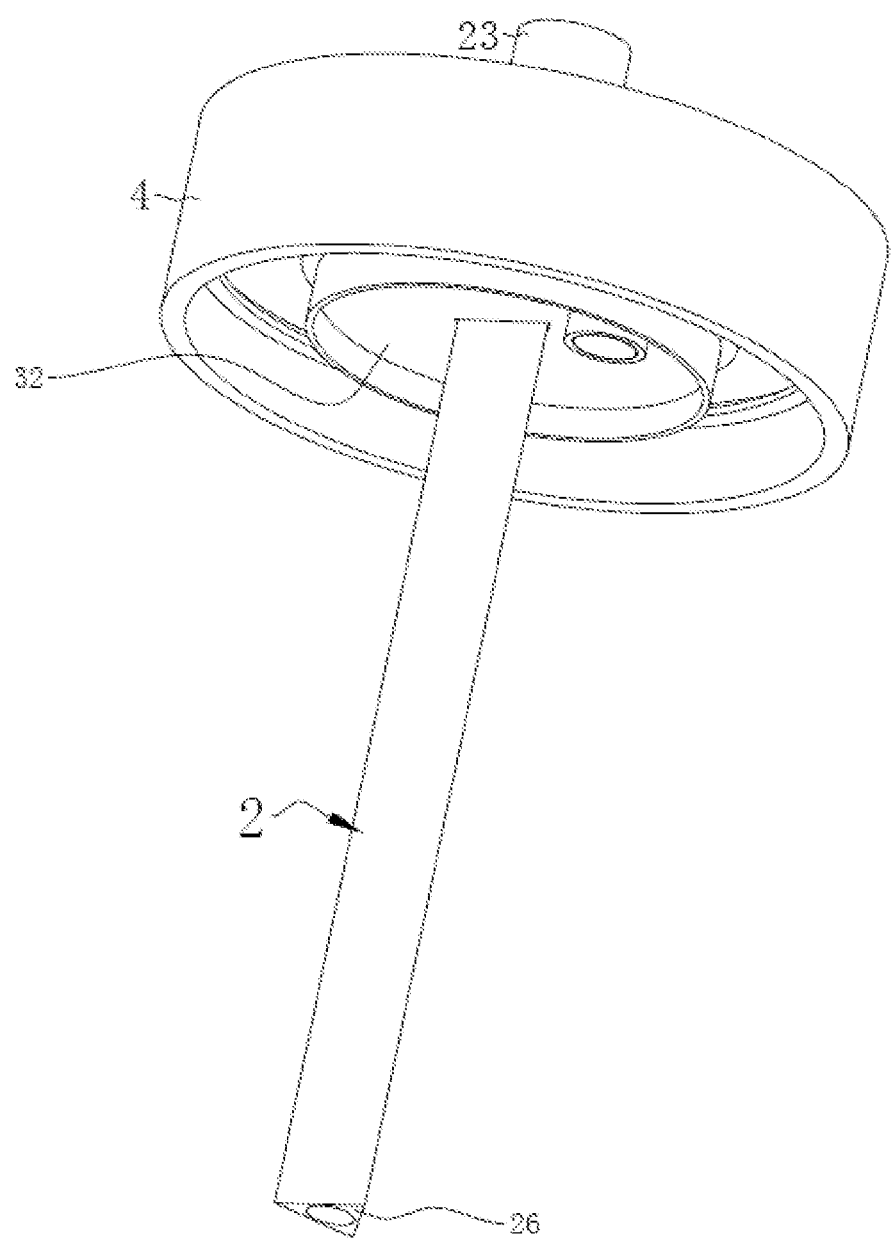
FIG. 10 is the stereoscopic view of the cooperation of the straw and the cup lid according to an embodiment of the present application.
Figure 11:
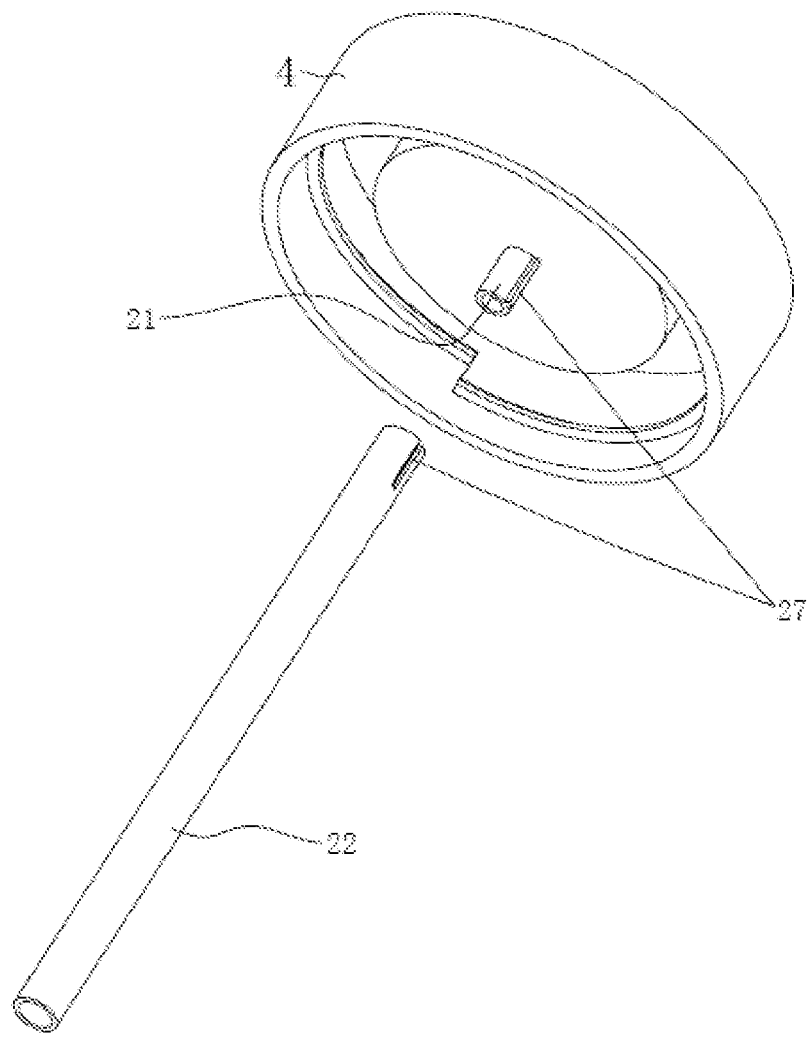
FIG. 11 is a stereoscopic view of the cooperation of the straw and the cup lid according to another embodiment of the present application.
Figure 12:
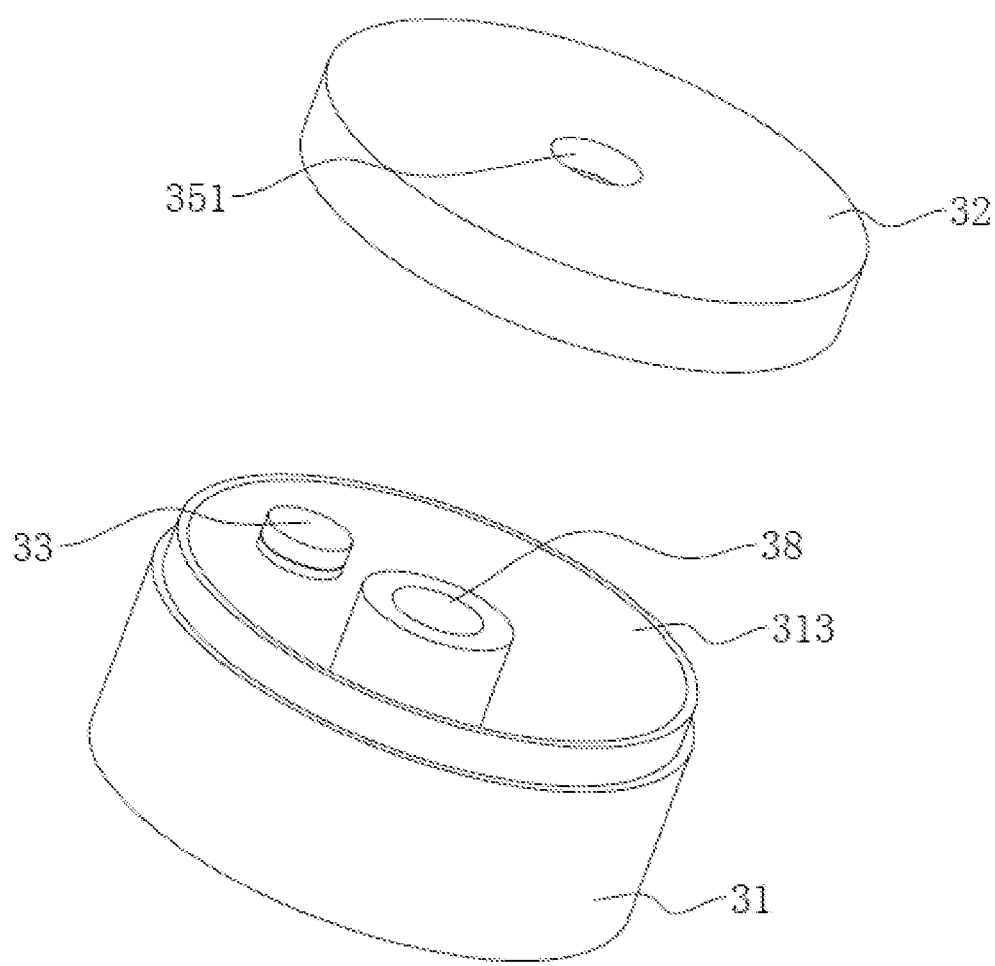
FIG. 12 is an explosive view from another angle of view of the tea strainer according to an embodiment of the present application.
Figure 13:
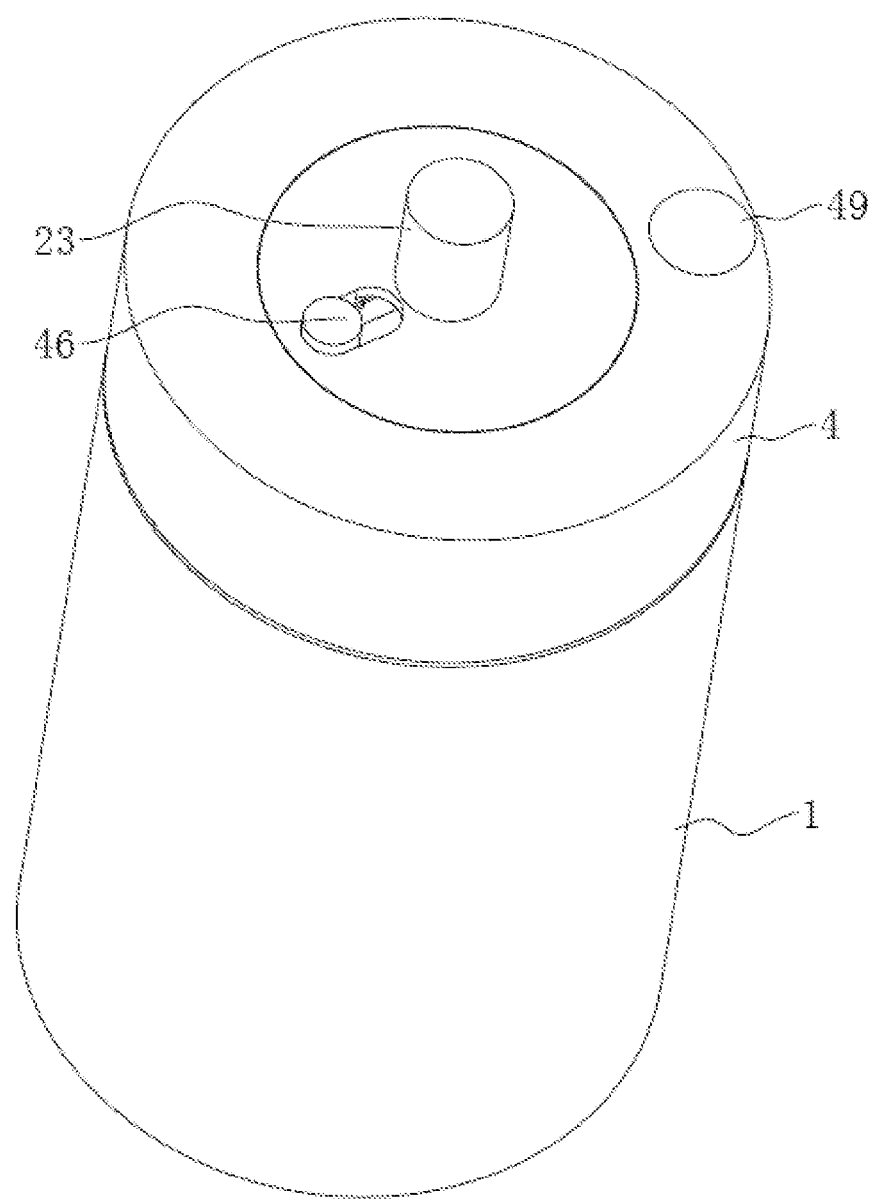
FIG. 13 is a stereoscopic view of a straw cup according to an embodiment of the present application.
Figure 14:
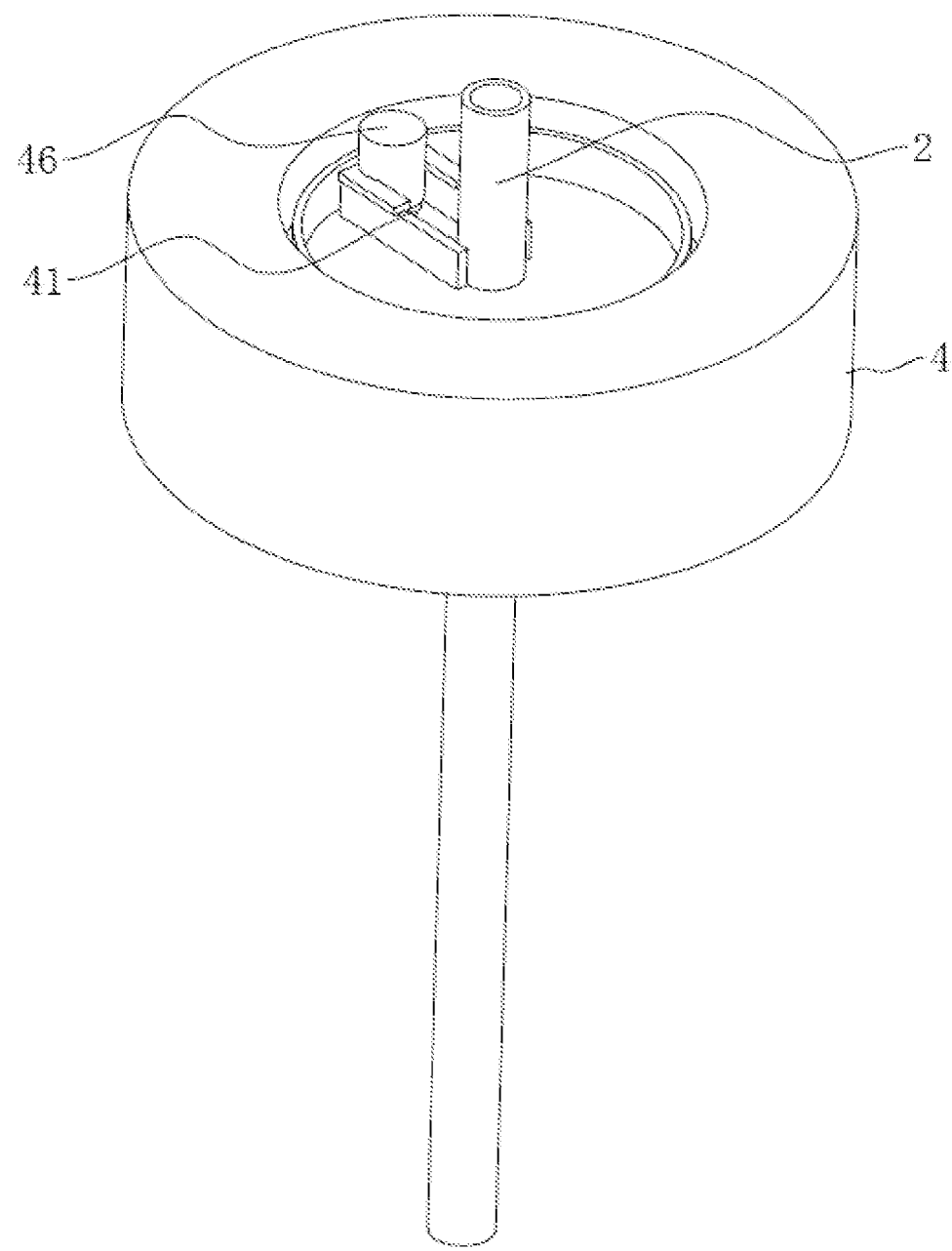
FIG. 14 is a stereoscopic view of the cooperation of the push-pull device and the cup lid according to an embodiment of the present application, with some components hidden.
Figure 15:
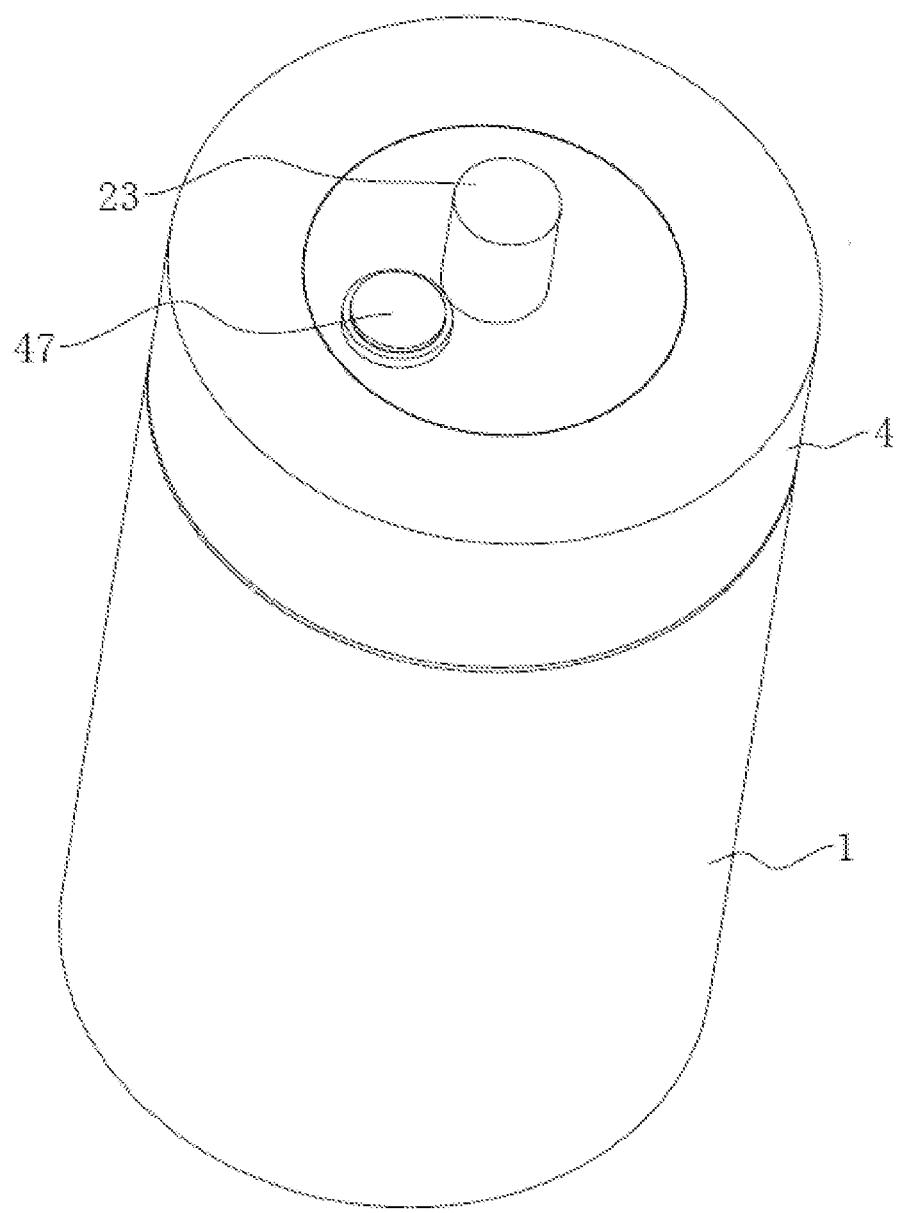
FIG. 15 is a stereoscopic view of a straw cup according to an embodiment of the present application.
Figure 16:
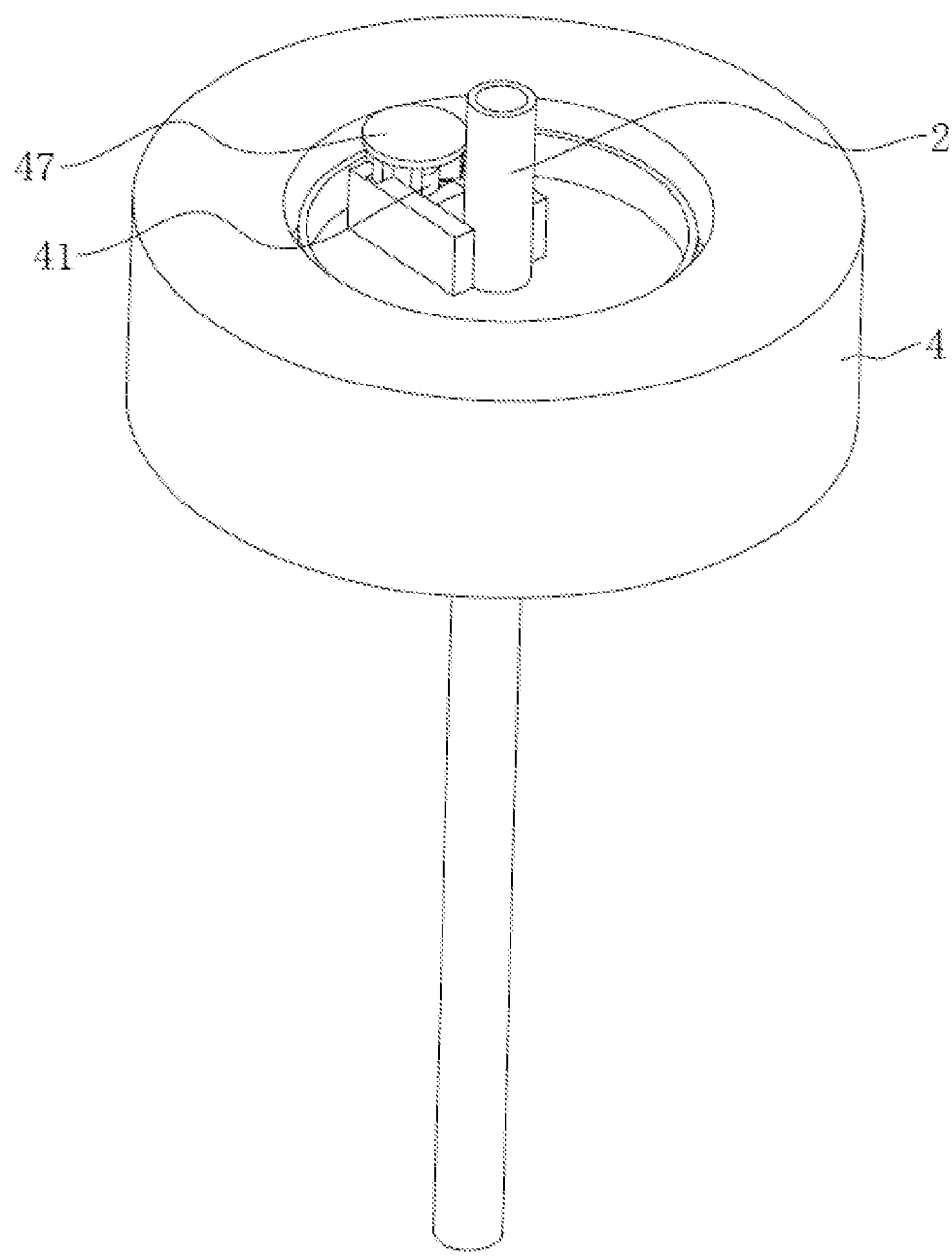
FIG. 16 is a stereoscopic view of the cooperation of the pressing device and the cup lid according to an embodiment of the present application, with some components hidden.
Figure 17:
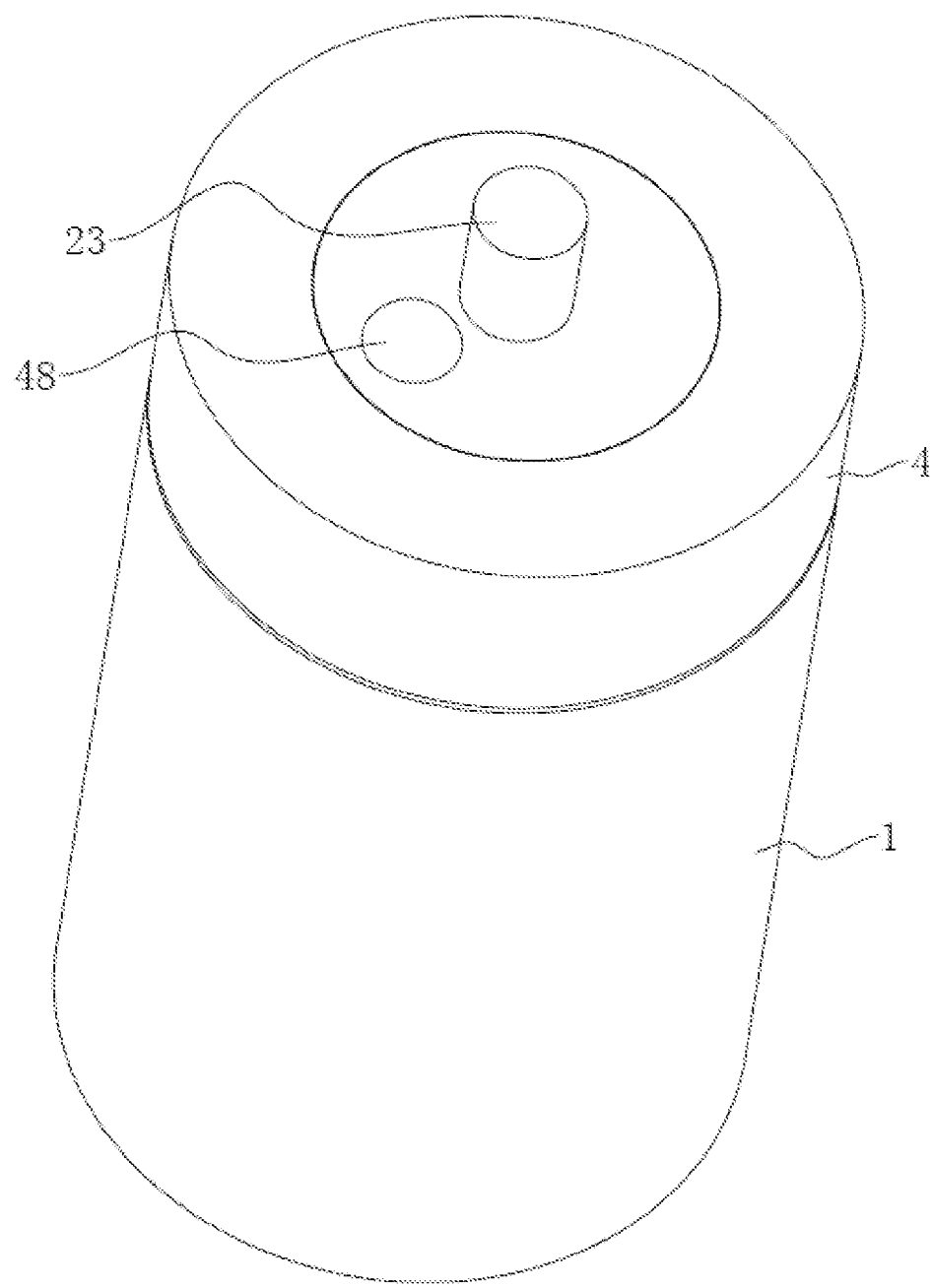
FIG. 17 is a stereoscopic view of a straw cup according to an embodiment of the present application.
Figure 18:
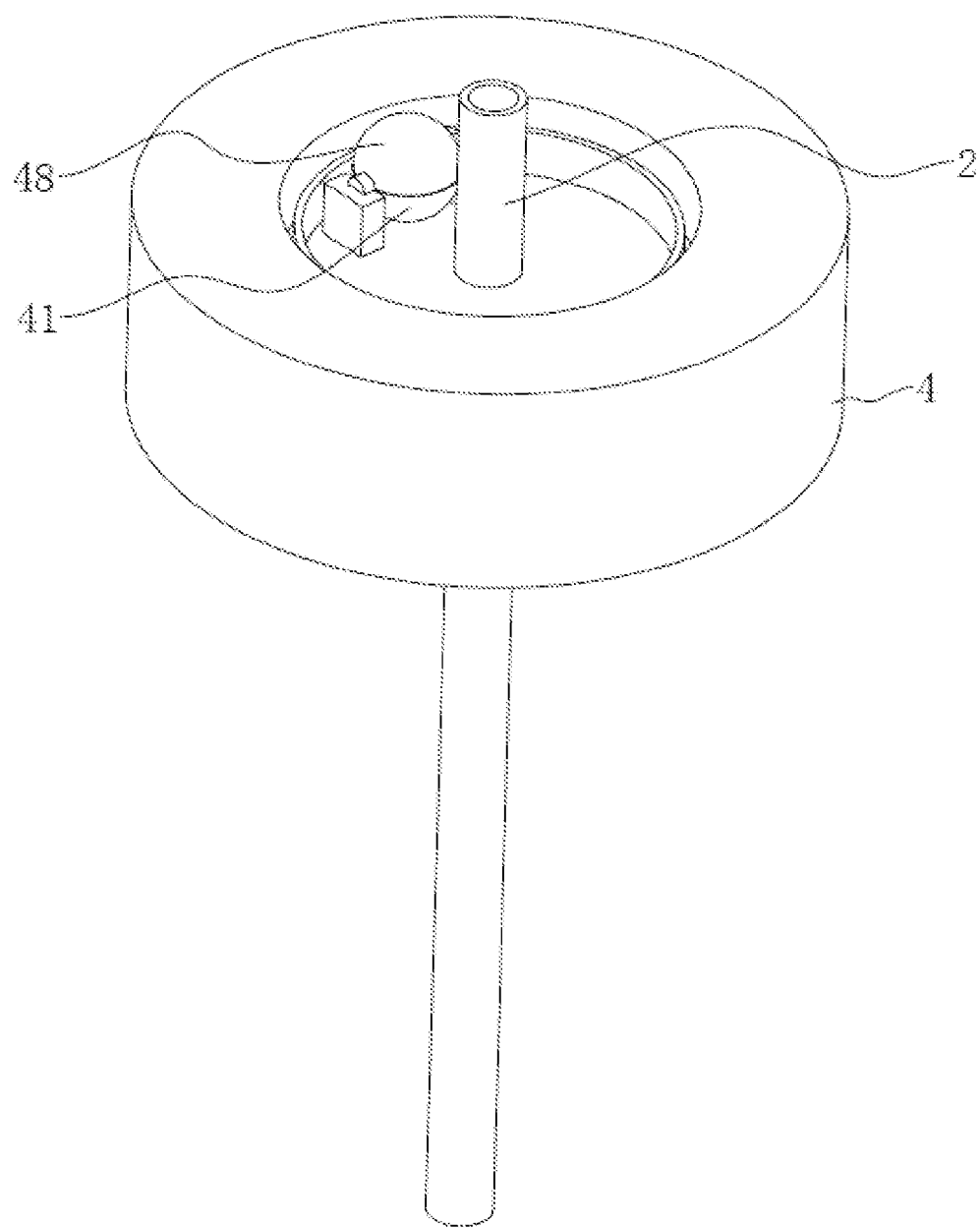
FIG. 18 is a stereoscopic view of the cooperation of the reversing device and the cup lid according to an embodiment of the present application, with some components hidden.

With further reference to FIG. 2 and FIG. 9, the cup lid 4 and the tea strainer 3 can be configured to attract to each other or separate from each other. When the tea strainer 3 and the cup lid 4 are in the attracted state, the tea leaves in the tea strainer 3 cannot be soaked in the water in the inner cavity 12 of the cup body 1, or a small amount of tea leaves in the tea strainer 3 can be directly soaked in the water in the inner cavity 12 of the cup body 1, which facilitates reducing the concentration of the tea. After the tea strainer 3 and the cup lid 4 are separated from each other, the tea strainer 3 can move along the longitudinal direction of the straw 2 until it reaches the bottom of the straw 2, as shown in FIG. 9.

Specifically, the tea strainer 3 includes a first magnetic component 33, the cup lid 4 includes a second magnetic component 41. The position of the second magnetic component 41 relative to the first magnetic component 33 or the magnetic pole of the second magnetic component 41 close to the first magnetic component 33 can be changed, so that there is a magnetic attraction effect between the first magnetic component 33 and the second magnetic component 41 when the second magnetic component 41 is in a first state, and there is a magnetic mutual repulsion between the first magnetic component 33 and the second magnetic component 41 or there is no magnetic attraction effect between the first magnetic component 33 and the second magnetic component 41 when the second magnetic component 41 is in a second state. The cup lid 4 and the tea strainer 3 are attracted to each other when the second magnetic component 41 is in the first state, and the cup lid 4 and the tea strainer 3 are separated from each other when the second magnetic component 41 is in the second state. Since the tea strainer 3 is fixed on the straw 2, the tea strainer 3 can move along the longitudinal axis of the straw 2 until it reaches the bottom of the cup body 1 after the tea strainer 3 is separated from the cup lid 4.

In a preferred embodiment, the relative position of the second magnetic component 41 and the first magnetic component 33 is variable, includes the first magnetic component 33 and the second magnetic component 41 are close to or away from each other in horizontal direction, or the first magnetic component 33 and the second magnetic component 41 are close to or away from each other in longitudinal direction, or one of the first magnetic component 33 and the second magnetic component 41 changes the relative position by reversing the magnetic pole. In particular, one of the first magnetic component 33 and the second magnetic component 41 changes the relative position by reversing the magnetic pole, which means the orientation of the magnetic poles is changed by rotation of the magnetic pole.

In particular, the first magnetic component 33 and the second magnetic component 41 are close to or away from each other in horizontal direction means that the position of the first magnetic component 33 is fixed, and the position of the second magnetic component 41 relative to the longitudinal axis of the first magnetic component 33 remains unchanged, while its horizontal position changes. When the horizontal distance between the second magnetic component 41 and the first magnetic component 33 is zero, the first magnetic component 33 and the second magnetic component 41 are aligned in the longitudinal axis direction, and the tea strainer 3 is attracted to the cup lid 4. When the second magnetic component 41 is far away from the first magnetic component 33, the tea strainer 3 is separated from the cup lid 4. Vice versa, the position of the second magnetic component 41 is fixed, and the position of the first magnetic component 33 relative to the longitudinal axis of the second magnetic component 41 remains unchanged, while its horizontal position changes. When the horizontal distance between the first magnetic component 33 and the second magnetic component 41 is zero, the first magnetic component 33 and the second magnetic component 41 are aligned in the longitudinal axis direction, and the tea strainer 3 is attracted to the cup lid 4. When the first magnetic component 33 is far away from the second magnetic component 41, the tea strainer 3 is separated from the cup lid 4.

The first magnetic component 33 and the second magnetic component 41 are close to or away from each other in vertical direction means that the positions of the first magnetic component 33 and the second magnetic component 41 in the horizontal direction remain unchanged, and the relative distance between the first magnetic component 33 and the second magnetic component 41 in the longitudinal direction changes, that is, they can be close to and far away from each other in the longitudinal direction. When the two are close to each other, the tea strainer 3 is fixed under the cup lid 4. When the two are far away from each other, the tea strainer 3 is separated from the cup lid 4 and falls into the cup body.

The first magnetic component 33 and the second magnetic component 41 changes the relative position by reversing the magnetic pole means that the position of the first magnetic component 33 is fixed, and the second magnetic component 41 flips the magnetic pole by reversing itself, thereby achieving attraction and disengagement from the first magnetic component 33. Alternatively, the position of the second magnetic component 41 is fixed, and the first magnetic component 33 flips the magnetic pole by reversing itself, thereby achieving attraction and disengagement from the second magnetic component 41.

In some embodiments provided by the present application, the cup lid 4 has a magnetic area and a non-magnetic area, the magnetic area and the non-magnetic area are arranged horizontally relative to the cup lid, or arranged vertically relative to the cup lid. The second magnetic component 41 is configured to be movable from the magnetic area to the non-magnetic area. When the second magnetic component 41 rotates to the magnetic area, the second magnetic component 41 is close to the first magnetic component 33, so that the second magnetic component 41 and the first magnetic component 33 are magnetically attracted, and thus the tea strainer 3 and the cup lid 4 are attracted. When the second magnetic component 41 rotates to the non-magnetic area, the second magnetic component 41 and the first magnetic component 33 are completely staggered, so that there is no magnetic attraction between the second magnetic component 41 and the first magnetic component 33, and thus the tea strainer 3 is separated from the cup lid 4.

Specifically, the cup lid 4 includes a rotatable device 42. A groove 43 is formed at one end of the cup lid 4. The rotatable device 42 is engaged in the groove 43. The rotatable device 42 further includes a first cylindrical part 421 for accommodating the second magnetic component 41. The rotatable device 42 further includes a bump 422. The bump 422 is configured to be able to rotate relative to the body of the cup lid 4, so as to bring the second magnetic component 41 contained inside the first cylindrical part 421 to rotate.

The tea strainer lid 32 includes a second cylindrical part 34 for accommodating the first magnetic component 33. When the second magnetic component 41 is in the magnetic area, the first cylindrical part 421 is right opposite to the second cylindrical part 34. The tea strainer lid 32 and the cup lid 4 are in an attracted state, so that the tea strainer 3 is attracted to the cup lid 4. The bump 422 on the rotatable device 42 is driven, so that the second magnetic component 41 rotates horizontally in the groove 43. The second magnetic component 41 gradually moves to the non-magnetic area. Correspondingly, the second magnetic component 41 and the first magnetic component 33 are gradually staggered, so that the magnetic attraction effect of the cup lid 4 on the tea strainer 3 is gradually weakened or even lost. The tea strainer 3 moves along the longitudinal axis of the straw 2 under the action of gravity, and slides down to the bottom of the straw 2. The tea leaves in the tea strainer 3 come into contact with the water in the straw cup, and the tea making process begins.

After the tea is socked for a period of time and the concentration of the tea is high, the rotatable device 42 can be adjusted so as to rotate the second magnetic component 41 to the magnetic area, and at the same time the straw cup is turned upside down. The tea strainer 3 moves in the direction closer to the cup lid 4 under the action of gravity, until the tea strainer 3 is close to the cup lid 4. The first magnetic component 33 in the tea strainer 3 and the second magnetic component 41 on the cup lid 4 are magnetically attracted to each other. The tea strainer 3 and the cup lid 4 remain attracted. After the straw cup is erected again, the attracted state between the tea strainer 3 and the cup lid 4 is still maintained.

In the second embodiment provided by the present application, the difference from the above embodiment lies in that, the cup lid 4 includes a push-pull device, and the second magnetic component 41 is fixed inside the push-pull device. The push-pull device is driven, so that the second magnetic component 41 can switch between the magnetic area and the non-magnetic area. When the second magnetic component 41 is located in the non-magnetic area, the magnetic effect between the second magnetic component 41 and the first magnetic component 33 gradually weakens or even disappears, so that the tea strainer 3 is separated from the cup lid 4. The tea strainer 3 slides down to the bottom of the inner cavity 12 along the longitudinal direction of the straw 2 under the action of gravity. When the second magnetic component 41 is located in the magnetic area, the tea strainer 3 can be magnetically connected to the cup lid 4.

In the third embodiment provided by the present application, the difference from the above embodiment lies in that, the cup lid 4 includes a pressing device, and the second magnetic component 41 is fixed inside the pressing device. The pressing device is driven, so that the second magnetic component 41 can switch between the magnetic area and the non-magnetic area. When the second magnetic component 41 is located in the non-magnetic area, the magnetic effect between the second magnetic component 41 and the first magnetic component 33 gradually weakens or even disappears, so that the tea strainer 3 is separated from the cup lid 4 and slides down to the bottom of the inner cavity 12 along the longitudinal direction of the straw 2. When the second magnetic component 41 is located in the magnetic area, the tea strainer 3 can be magnetically connected to the cup lid 4.

In the fourth embodiment provided by the present application, the difference from the above embodiment lies in that, the second magnetic component 41 in the cup lid 4 is configured to be capable of reversing the magnetic pole. Specifically, the cup lid 4 includes a reversing device. The second magnetic component 41 is fixed inside the reversing device. The reversing device is driven, so that the second magnetic component 41 can change its polarity close to the first magnetic component 33. When the second magnetic component 41 and the first magnetic component 33 have different magnetic poles, the second magnetic component 41 and the first magnetic component 33 maintain magnetic attraction. The tea strainer 3 is attracted and fixed on the cup lid 4. When the second magnetic component 41 and the first magnetic component 33 have the same magnetic pole, the second magnetic component 41 and the first magnetic component 33 magnetically repel each other. The tea strainer 3 and the cup lid 4 are separated.

In some embodiments, as shown in FIG. 2, the straw 2 can be disposed through the tea strainer 3. Specifically, the tea strainer lid 32 is formed with a first penetration hole 351, and the bottom wall of the body 31 is formed with a second penetration hole 352 allowing the straw 2 to pass through. The straw 2 is inserted into the interior of the first cavity 312 through the first penetration hole 351 and protrudes through the second penetration hole 352. In particular, the first penetration hole 351 and the second penetration hole 352 are arranged oppositely. The straw 2 can be the longitudinal axis of the tea strainer 3, which facilitates the sliding of the tea strainer 3 along the straw 2.

Further, a guide tube can be further disposed inside the tea strainer 3. The first end of the guide tube is connected to the first penetration hole 351. The second end of the guide tube is connected to the second penetration hole 352. The straw 2 is inserted into the first penetration hole 351 and further inserted into the guide tube and protrudes through the second penetration hole 352.

In other alternative embodiments, a connection structure connected to the straw 2 is provided outside the tea strainer 3. The connection structure may be a snap-in structure or a plug-in mechanism. Specifically, the connection structure may be the buckle 37 of the tea strainer 3 in FIG. 4 or the sleeve part 36 of the tea strainer 3 in FIG. 5.

Figure 5:
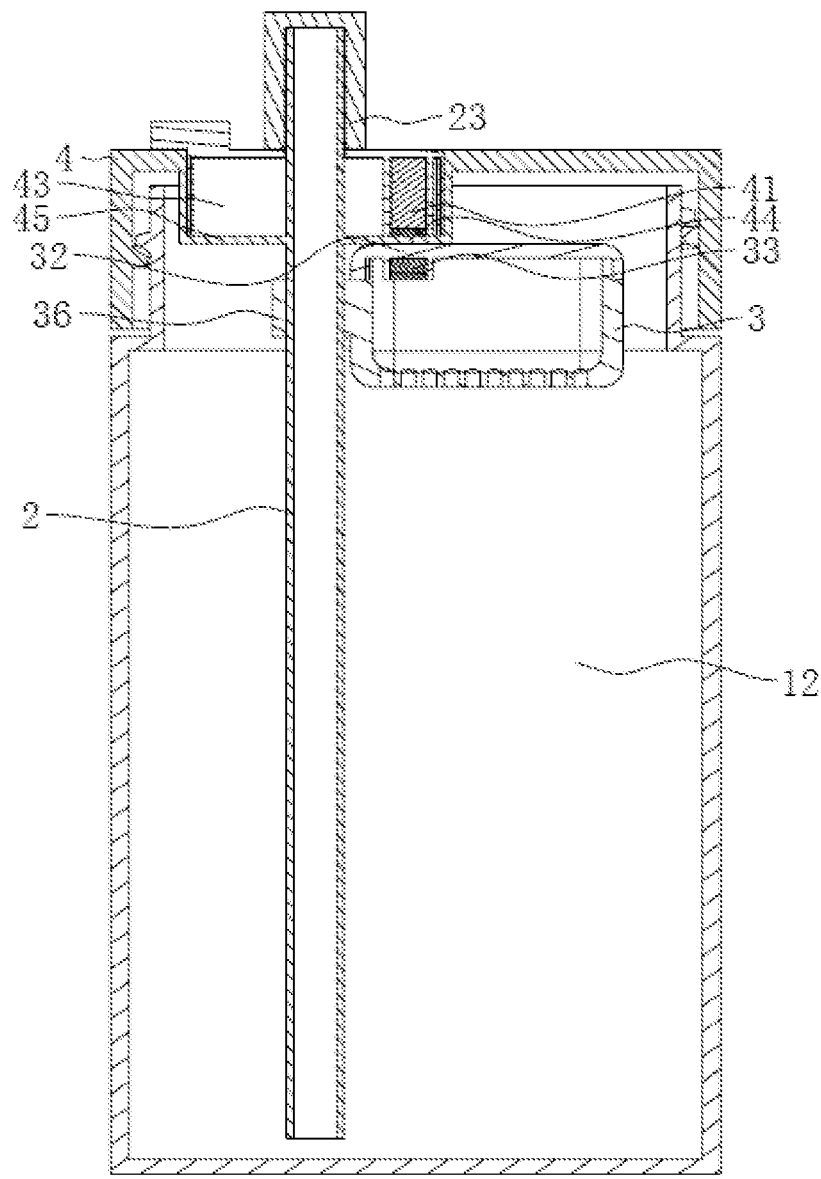
FIG. 5 is a cross-sectional view of the straw cup according to the fourth embodiment of the present application.
Figure 8:
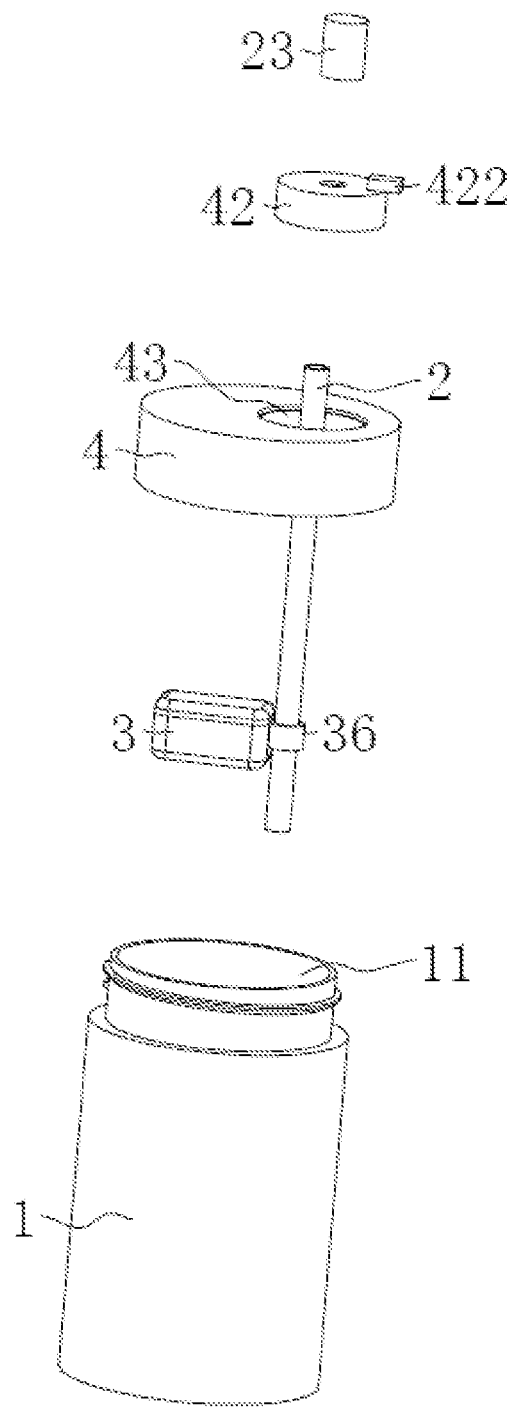
FIG. 8 is an explosive view of the straw cup according to an embodiment of the present application.

In one embodiment provided in FIG. 5 and FIG. 8, a sleeve part 36 is disposed on the side wall of the body 31 of the tea strainer 3. The sleeve part 36 can be a section of a sleeve or a collar or a collet for the straw 2 to pass through. The straw 2 is configured to pass through the sleeve, collar or collet. And the sleeve, collar or collet is freely longitudinally movable relative to the straw 2, so that the tea strainer 3 is configured to be able to move along the longitudinal direction of the straw 2.

Figure 4:
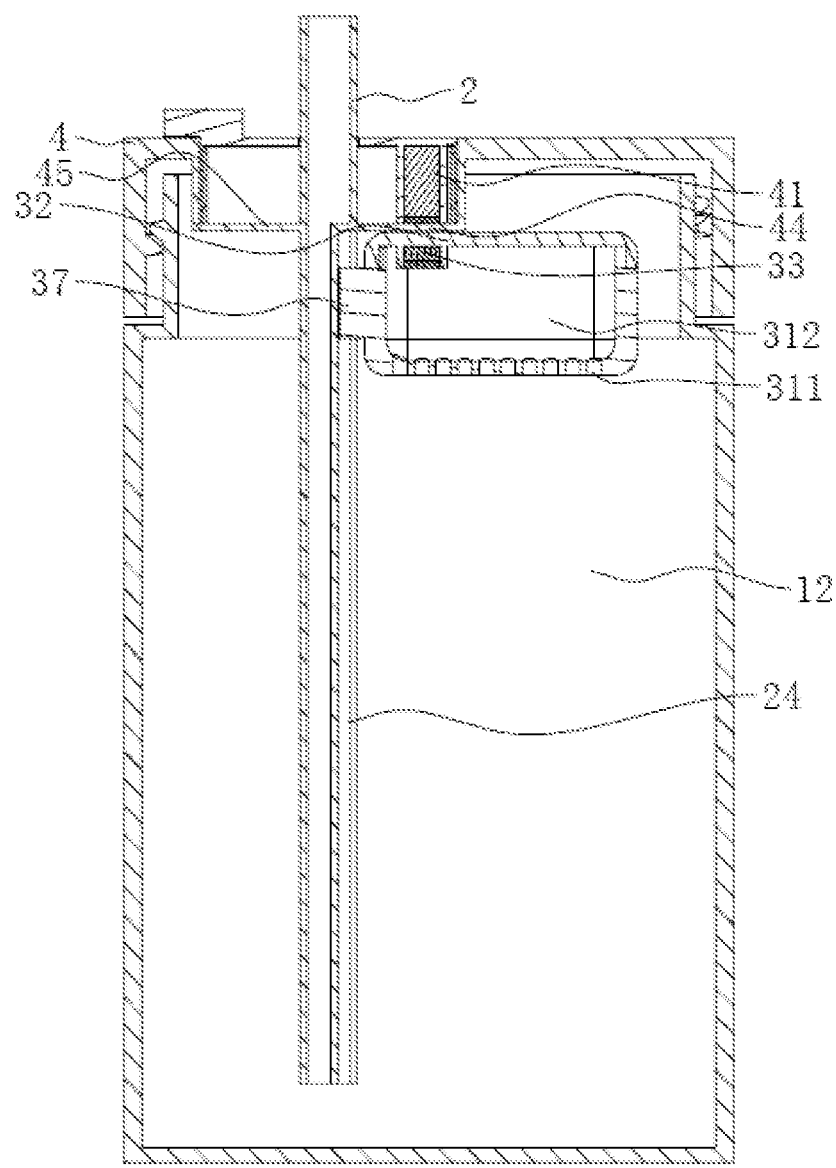
FIG. 4 is a cross-sectional view of the straw cup according to the third embodiment of the present application.

In another embodiment provided by the present application, as shown in FIG. 4, a sliding slot 24 is provided on a side wall of the straw 2. A buckle 37 is provided on the side wall of the body 31 of the tea strainer 3. The buckle 37 can be engaged in the sliding slot 24 and the buckle 37 is configured to be able to slide longitudinally inside the sliding slot 24.

In order to prevent the tea strainer 3 from being separated from the straw 2 during the longitudinal movement of the straw 2, a limiting structure can be provided at the bottom of the straw 2. The limiting structure can be a protrusion.

Furthermore, the connection between the tea strainer 3 and the straw 2 is an anti-rotation connection. Specifically, the position of the tea strainer relative to the circumferential direction of the straw is relatively fixed. For example, the straw hole formed in the tea strainer 3 can be a non-circular shape, such as a triangle, an ellipse or a polygon, etc. Correspondingly, the straw 2 is configured to have a corresponding cross-sectional shape, so as to prevent the horizontal rotation between the tea strainer 3 and the straw 2 and the looseness. The stability of the straw cup is improved.

Furthermore, when the straw 2 has interconnected first section of the straw 21 and a second section of the straw 22, the tea strainer 3 is fixed on the second section of the straw 22. A positioning structure is provided at the connection point between the first section of the straw 21 and the second section of the straw 22. The positioning structure is configured to restrict the second section of the straw 22 from rotating or moving relative to the first section of the straw 21, so as to improve the stability of the straw cup.

In a preferred embodiment, when the magnetic attraction between the tea strainer 3 and the cup lid 4 weakens, the tea strainer 3 and the cup lid 4 are separated. The tea strainer 3 is configured to be able to slide down freely along the straw 2 under the action of gravity. In particular, the connection between the tea strainer 3 and the straw 2 is a non-tight connection. For example, the outer wall of the straw 2 is configured to be smooth, or the connecting wall of the tea strainer 3 in contact with the straw 2 is configured to be smooth, so that the friction between the tea strainer 3 and the straw 2 is as low as possible, or the outer diameter of the straw 2 is slightly smaller than the inner diameter of the connecting wall of the tea strainer 3. This facilitates the tea strainer 3 to slide on the straw 2 without obstruction.

In a preferred embodiment, the opening of the cup body 1 of the straw cup of the present application has a diameter less than 18 cm. Further, the diameter of the opening of the cup body 1 is greater than 8 cm. For example, the inner diameter of the opening of the cup body 1 can be 10 cm, 12 cm, 14 cm or 16 cm. It is relatively suitable to dispose the above-mentioned tea strainer 3 structure on a straw cup with a small cup mouth, and it also makes the straw cup itself portable.

In other alternative embodiments, in addition to the straw 2, the cup lid 4 can further has a drinking port. The user can choose to use the straw 2 or the drinking port to drink water, which improves the user experience.

In addition to control the movement of the cup lid 4 through the magnetic connection between the tea strainer 3 and the cup lid 4, and in turn control the first magnetic component 33 to move from the magnetic area to the non-magnetic area, in another embodiment provided by the present application, the straw cup is also provided with a driving mechanism connected to the tea strainer 3. The driving mechanism is driven to bring the second magnetic component 41 inside the tea strainer 3 to move relative to the first magnetic component 33, so that the second magnetic component 41 gradually moves away from the first magnetic component 33, and thus the magnetic connection between the tea strainer 3 and the cup lid 4 is disconnected. The driving mechanism may be a pressing mechanism or a push-pull structure.

Explanation of Reference Signs 1. cup body;
11. opening;
12. inner cavity;
2. straw;
21. first section of the straw;
22. second section of the straw;
23. dust cap;
24. sliding slot;
25. limiting structure;
26. anti-rotation structure;
27. positioning structure;
3. tea strainer;
31. body;
311. through hole;
312. first cavity;
313. end opening;
32. tea strainer lid;
33. first magnetic component;
34. second cylindrical part;
351. first penetration hole;
352. second penetration hole;
36. sleeve part;
37. buckle;
38. guide tube;
4. cup lid;
41. second magnetic component;
42. rotatable device;
421. first cylindrical part;
422. bump;
43. groove;
44. magnetic area;
45. non-magnetic area;
46. push-pull device;
47. pressing device;
48. flipping structure; and
49. drinking port.

What is claimed is:

1. A straw cup comprising:
a cup body having a hollow inner cavity;
a cup lid configured to cover an opening of the cup body;
a straw configured to extend into the hollow inner cavity of the cup body, and at least a first part of the straw is connected with the cup lid; and
a tea strainer comprising a first magnetic component,
wherein the cup lid comprises a second magnetic component that is configured to magnetically attract the first magnetic component, a relative position of the second magnetic component and the first magnetic component is variable, such that the tea strainer is configured to be magnetically connected to or separated from the cup lid, and the tea strainer is connected with the straw, such that the tea strainer is configured to move along a direction of a longitudinal axis of the straw;
wherein the tea strainer is configured to move along the longitudinal axis of the straw in a direction away from the cup lid, or the tea strainer is configured to be able to move along the longitudinal axis of the straw in a direction toward the cup lid; and
wherein the relative position of the second magnetic component and the first magnetic component being variable means that:
one of the first magnetic component or the second magnetic component changes the relative position by reversing a magnetic pole,
and
the first magnetic component and the second magnetic component are close to or away from each other in a horizontal direction, or the first magnetic component and the second magnetic component are close to or away from each other in a longitudinal direction.

2. The straw cup according to claim 1, wherein a lower end of the straw is provided with a limiting structure configured to prevent the tea strainer from falling off freely from the straw.

3. The straw cup according to claim 1, wherein the cup lid is provided with a magnetic area and a non-magnetic area, the magnetic area and the non-magnetic area are arranged horizontally relative to the cup lid or arranged vertically relative to the cup lid, the second magnetic component is configured to be movable from the magnetic area to the non-magnetic area, when the second magnetic component is in the magnetic area, the tea strainer and the cup lid are attracted to each other, and when the second magnetic component is in the non-magnetic area, the tea strainer and the cup lid are separated from each other.

4. The straw cup according to claim 3, wherein the cup lid comprises a rotatable device, and the second magnetic component is connected with the rotatable device and configured to drive the rotatable device, such that the second magnetic component is switched between the magnetic area and the non-magnetic area.

5. The straw cup according to claim 3, wherein the cup lid comprises a movable push-pull device, and the second magnetic component is connected with the movable push-pull device and configured to drive the movable push-pull device, such that the second magnetic component is switched between the magnetic area and the non-magnetic area.

6. The straw cup according to claim 3, wherein the cup lid comprises a movable pressing device, and the second magnetic component is connected with the movable pressing device and configured to drive the movable pressing device, such that the second magnetic component is switched between the magnetic area and the non-magnetic area.

7. The straw cup according to claim 3, wherein the cup lid comprises a flipping structure, and the second magnetic component is connected with the flipping structure and configured to drive the flipping structure, such that the magnetic pole of the second magnetic component relative to the first magnetic component is changed.

8. The straw cup according to claim 1, wherein the tea strainer comprises a tea strainer body and a tea strainer lid configured for covering an end opening of the tea strainer body, the tea strainer lid has a first penetration hole for the straw to pass through, and a bottom of the tea strainer body has a second penetration hole for the straw to pass through.

9. The straw cup according to claim 8, wherein a guide tube is connected between the first penetration hole and the second penetration hole, and the straw is configured to be sequentially inserted into the first penetration hole, the guide tube and extend out of the second penetration hole.

10. The straw cup according to claim 1, wherein a connection structure configured for connecting with the straw is disposed outside the tea strainer.

11. The straw cup according to claim 10, wherein the connection structure is a snap-in structure or a plug-in mechanism.

12. The straw cup according to claim 10, wherein one of the tea strainer or the straw is provided with a protrusion, the other of the straw or the tea strainer is formed with a longitudinally extended sliding slot, and the protrusion is configured to be inserted into and movable in the longitudinally extended sliding slot.

13. The straw cup according to claim 11, wherein the connection structure is a sleeve, a collar or a collet disposed on a periphery of the tea strainer for the straw to pass through, and the straw is configured to be inserted into the sleeve, the collar or the collet and is configured to move longitudinally.

14. The straw cup according to claim 1, wherein an anti-rotation structure is disposed between the straw and the tea strainer, and the anti-rotation structure is configured to fix a position of the tea strainer relative to a circumferential direction of the straw.

15. The straw cup according to claim 1, wherein the straw comprises a first section and a second section, the first section of the straw is connected with the cup lid, and the tea strainer is connected with the second section of the straw.

16. The straw cup according to claim 15, wherein a positioning structure is disposed between the first section of the straw and the second section of the straw, and the positioning structure is configured to limit a rotation or a movement of the second section of the straw relative to the first section of the straw.

17. The straw cup according to claim 1, wherein the opening has an inner diameter of less than 18 cm.

18. The straw cup according to claim 1, wherein the cup lid further comprises a drinking port, and a user can choose to use the straw or the drinking port for drinking.

19. The straw cup according to claim 1, wherein a part of the straw extends outside the cup lid, and the straw cup further comprises a dust cover configured for protecting the part of the straw that extends outside the cup lid.

* * * * *